March 24, 1936.  W. MILLER ET AL  2,035,332
SLIME CRUSHING MACHINE
Filed Feb. 1, 1932   2 Sheets-Sheet 1
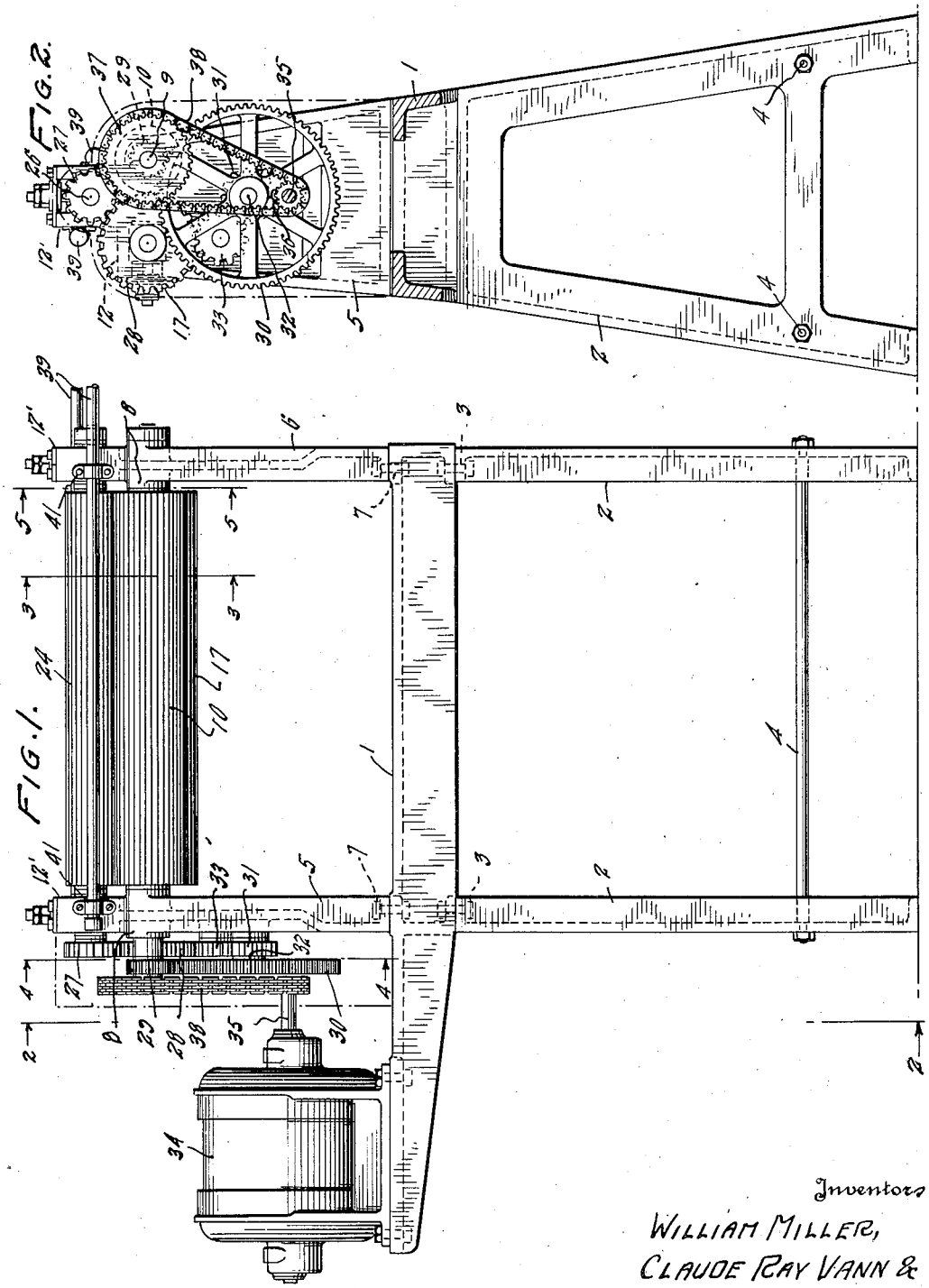
Inventors
WILLIAM MILLER,
CLAUDE RAY VANN &
FRANK GEORGE SMERSAL
By Semmes & Semmes Attorneys March 24, 1936. W. MILLER ET AL 2,035,332
SLIME CRUSHING MACHINE
Filed Feb. 1, 1932 2 Sheets-Sheet 2
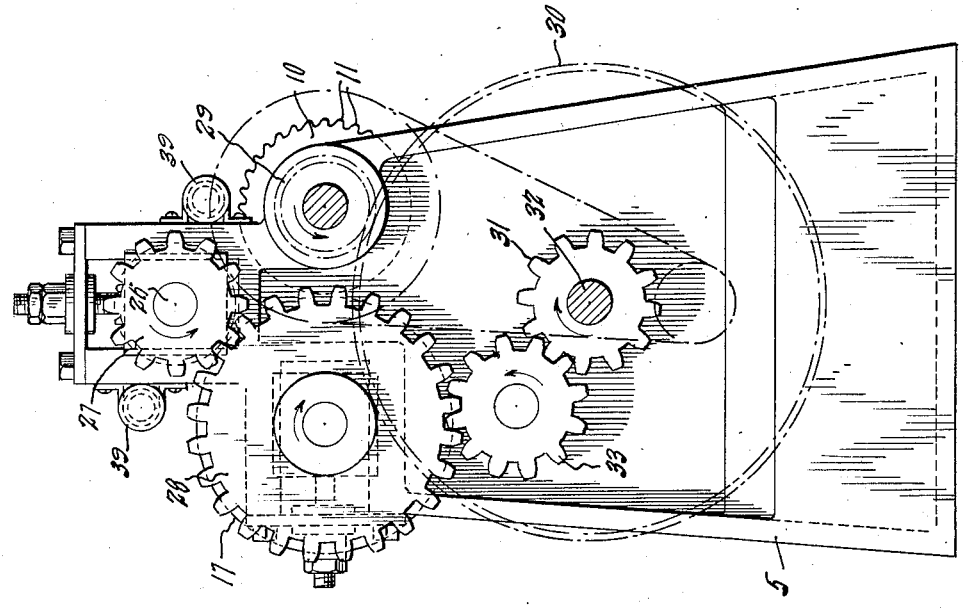
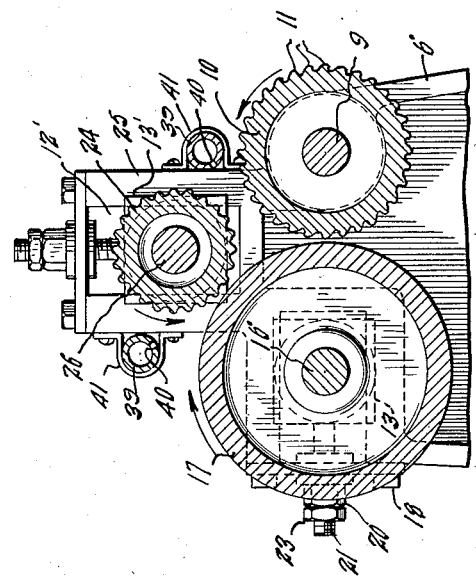
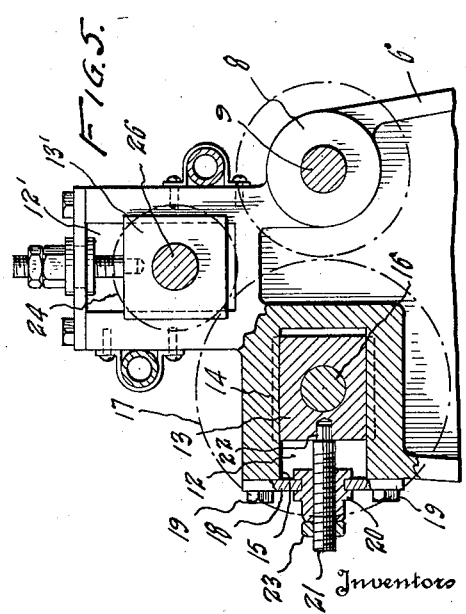
Inventors
WILLIAM MILLER,
CLAUDE RAY VANN &
FRANK GEORGE SMERSAL
By Semmes & Semmes Attorneys

Patented Mar. 24, 1936

2,035,332

UNITED STATES PATENT OFFICE 2,035,332

SLIME-CRUSHING MACHINE

William Miller, Kansas City, Kans., Claude Ray Vann, Kansas City, Mo., and Frank George Smersal, Kansas City, Kans.

Application February 1, 1932, Serial No. 590,290

10 Claims. (Cl. 17—43)

The present invention relates to the preparation of animal intestines for industrial purposes, and more particularly has reference to a machine for breaking or loosening the slime on the interior walls of animal intestines.

It has long been known that animal intestines may be used for various purposes in the industrial arts. Prior to using animal intestines for the various purposes for which they are suited, it is necessary to remove extraneous material both from the exterior and interior walls. Various apparatus have been developed for removing the undesirable material from the walls of the animal intestines, but as yet, there has been no apparatus developed which successfully removes all of the material without damage to the walls of the intestines.

Many developments have been made in which the loss due to carrying or otherwise impairing the walls of the intestines has been reduced to a minimum, but as yet, there is no actually perfect development. The above difficulties are especially true in machines for crushing and removing the slime or mucous membrane which adheres to the interior walls of animal intestines.

The present invention seeks to overcome the difficulties encountered in the removal of the slime or mucous membrane from the interior walls of the animal intestines.

A major object of this invention is to devise an improved apparatus for breaking or removing the slime or mucous membrane from the interior walls of animal intestines.

Another object of this invention is to devise an apparatus for breaking the slime from the walls of animal intestines which consists of means for feeding the intestines into the apparatus and means for crushing the slime in the intestines, both of said means cooperating with a common roller.

Still another object of this invention is to provide an apparatus for removing the slime from animal intestines which consists of a structure having three rollers, one roller serving as a common cooperating roller with each of the other two, and one of said rollers serving as a crushing roller for breaking the slime.

A further object of this invention is to provide an apparatus having incorporated therein a feed roller, a crushing roller and a common roller cooperating with each of the feed and crushing rollers, and means for rotating the crushing roller at a higher speed than the other rollers, and means for adjusting the distance the surface of the rollers are spaced apart.

A still further object is to devise an apparatus for crushing slimes of animal intestines which consists of a simplified structure having the least possible moving elements.

With these and other objects in view, which may be incident to our improvements, the invention consists in the parts and combinations to be hereinafter set forth and claimed, with the understanding that the several necessary elements comprising our invention may be varied in construction, proportions and arrangement, without departing from the spirit and scope of the appended claims.

The present invention consists in a structure comprising a framework having a plurality of rollers mounted therein, one of said rollers having its surface corrugated in such a manner as to effectively crush the slime from the intestines passing between this roller and another roller. The other roller referred to is in the form of a large smooth-surfaced roller which rotates at a speed considerably slower than that of the crushing roller. In order to feed the entrails through the apparatus, a feed roller which is also corrugated, cooperates with the large smooth surfaced roller and rotates at a speed relative to the other rollers, so that its peripheral speed will be the same as that of the smooth surfaced roller. Thus, the intestines will be moved through the apparatus upon passing through the feed roller and the smooth-surfaced roller and the crushing roller will serve to break the slime adhering to the interior walls of the intestines. Means are provided for adjusting the spacing between the several rollers and in addition means may be provided for spraying a fluid, such as steam or water, between the rollers as the intestines are passed therethrough.

In order to make our invention more clearly understood, we have shown, in the accompanying drawings, means for carrying the same into practical effect, without limiting the improvements in their useful applications, to the particular constructions which, for the purpose of explanation, have been made the subject of illustration.

In the drawings:

Figure 1 is a rear elevation view of an apparatus constructed in accordance with the present invention.

Figure 2 is a view taken on line 2—2 of Figure 1.

Figure 3 is a view taken on line 3—3 of Figure 1, and shows the construction of the several rollers.

Figure 4 is a sectional view taken on line 4—4, and shows the gear train associated with the several rollers for controlling the speed thereof.

Figure 5 is another sectional view taken on line 5—5 of Figure 1 and shows in detail the construction of the means for adjusting the space between the several rollers.

As clearly shown in the drawings, an apparatus constructed as herein described may comprise a base 1 which may be positioned on a bench or on the floor of a factory or other place in which the apparatus is to be used. In some instances, it is preferred to mount the base 1 upon the leg structure 2 which may be bolted to the base 1 by the fastening elements 3 or otherwise secured thereto. The leg structure 2 may be of any conventional form, and as shown in the drawings, consists of two A-frames having brace struts 4 extending between the lower portions thereof.

A pair of supporting members 5 and 6 are mounted on the base 1 in any suitable manner. As shown in the drawings, these support members may be secured to the base 1 by bolts or any conventional type of fastening means 7. As clearly shown in Figure 5, each of the support members is provided with a bearing mounting 8, in which is rotatably mounted a shaft 9. Shaft 9 has fixed thereon a roller 10, the surface of which is corrugated. It will be noted from a close inspection of Figure 3 that the corrugations are so formed as to have the appearance of saw-teeth when a cross sectional view of the same is made. It has been found by actual experiment that a roller provided with this type of corrugation serves to effectively break the slime or mucous membrane from the interior walls of the intestines with the least amount of action on the animal intestine wall.

In addition to the bearing mounting 8, each of the support members 5 and 6 is provided with a horizontal slot 12, at a height equivalent to that at which the bearing mounting 8 is positioned. Slidably mounted in the slot 12 is a bearing block 13 having flanges 14 adapted to cooperate with the side walls 15 of the slot 12 to maintain the block within the slot. Bearing block 13 has a shaft 16 rotatably mounted therein and this shaft has fixed thereon a roller 17. Roller 17 is adapted to cooperate with the roller 10 for crushing or breaking the slime from the interior walls of the animal intestines.

Shaft 16 carrying roller 17 is mounted in the slidable bearing blocks 13 so that the distance between the roller 17 and the surface between the corrugated roller 10 may be varied to compensate for wear on the rollers and for different size intestines. Any suitable means for adjusting the position of the bearing blocks 13 in the slots 12 may be employed. One form of this element which has been found to be preferable is clearly shown in Figures 3, 4 and 5. This consists of a plate 18 secured on the open face of the slot 12 by fastening means 19. Plate 18 is provided with an aperture in which is mounted a bushing 20 having a bore therein which is threaded. A screw 21 is threaded in the bushing 20 and has an end portion 22 of reduced size adapted to be received in a recess in the bearing block 13, so as to provide an effective engagement between the screw 21 and the bearing block 13. It will be appreciated that upon rotating the screw 21 in the desired direction, the bearing block 13 can be moved in the slot 12. In order to prevent accidental displacement of the bearing block 13, the screw 21 may be locked against rotation by means of a lock nut 23.

In addition to the rollers 10 and 17, the third roller 24 is carried by the support members 5 and 6. Extending from the upper portion of the support members 5 and 6 are a pair of guide members 25, forming therebetween a slot 12'. A bearing block 13' constructed identical to that mounted in the slot 12 is slidably positioned in the slot 12'. Means are provided identical with those shown associated with slot 12 for adjusting the position of the block 13' in the slot 12''.

Rotatably mounted in the block 13' is a shaft 26 on which is fixed the roller 24. As clearly shown in the drawings, the shaft 26 is mounted between but above the shafts 9 and 16. Roller 24, it will be noted, is considerably smaller than the rollers 10 and 17. The face of roller 24 is corrugated so that the same will more effectively engage with the intestines passing between the roller 24 and the roller 17. Roller 24 is constructed so that it may be adjusted in order to maintain a desired distance between the surface of this roller and the surface of roller 17.

It will be noted from the foregoing description that the roller 17, the surface of which is smooth and which may be constructed of brass or other suitable material, cooperates both with roller 24 and with roller 10, thereby being common to both of these rollers. It has been found that this type of construction provides a simple apparatus having the least number of essential parts.

It has been found that in order to obtain the maximum efficiency from the apparatus shown, the several rollers must be rotated at dependent relative speeds. For instance, the speeds of rollers 17 and 24 should be adjusted so that the peripheral speed of each will be equal. Therefore, when an intestine is passed between these rollers, there will be no relative movement between the portions of the intestine. It is essential, however, that roller 10 be rotated at a rate of speed considerably higher than that of the feed roller 24 and of the common roller 17. In order to provide for the relative speeds of the several rollers, a suitable gear train has been provided which is shown mounted on the outer surface of the support member 5. As clearly shown in Figure 4, shaft 26 has a pinion 27 secured thereon. This pinion is adapted to mesh with a spur gear 28 which is fixed on shaft 15. In the drawings, the roller 17 is of a diameter approximately twice that of the roller 24. Since the peripheral speed of each of these rollers should be the same, the spur gear 28 has twice the number of teeth as that of the pinion 27, so that the roller 24 will have a rotary speed which is twice as great as that of the roller 17. It is desirable, as hereinbefore pointed out, to have the roller 10 rotate at a speed which is considerably greater than that of either of the other rollers in order to effect the crushing action on the slime or mucous membrane within the animal intestine undergoing treatment. Shaft 9, which carries the roller 10, has a pinion 29 fixed thereto adapted to mesh with a large spur gear 30 which is connected to a pinion 31, both of which are mounted upon a stub shaft 32. Due to the relative size of the spur gear 30 and the pinion 29, it will be appreciated that the rotary speed of the shaft 9 will be considerably greater than that of the gear and pinion 30 and 31, respectively. Pinion 31 is adapted to be connected with the gear 28 by means of an idler 33.

Due to the relative size of the pinion 31 and the gear 28, there is a further reduction in speed between the gear 31 and the shaft 16. Thus, it will be appreciated that the rotary speed of the roller 10 is considerably greater than that of the roller 17. As a matter of fact, it has been found advantageous to so construct the gear train between the shaft 9 and the shaft 16 that when the shaft 9 rotates at a speed of approximately 400 revolutions per minute, the shaft 16 will rotate at a speed of approximately 35 revolutions per minute.

Due to the relatively high rotative speed of the shaft 9, this shaft can be connected to a source of power such as an electric motor, by a direct connection with only a slight speed reduction. For instance, as shown in Figures 1 and 2, a motor 34 may be mounted upon a portion of base 1 and have its shaft 35 connected with shaft 9 in any suitable manner. In the drawings, it will be noted that shaft 35 carries a sprocket 36 and shaft 9 has fixed thereto a large sprocket 37, approximately four times the diameter of sprocket 36. Power is transmitted from sprocket 36 to sprocket 37 by means of the silent chain 38. With this connection it will be appreciated that an ordinary electric motor capable of producing 1200 revolutions per minute may be connected with shaft 9, and thereby operate the slime crushing machine at the desired operating speed.

In some instances, it is desirable to spray water or steam onto the intestines as they pass between the several rollers in the apparatus. For this purpose, supply pipes 39 have been shown in the drawings. These pipes, it will be noted, are provided with suitable apertures 40 which are so positioned as to spray the fluid at the desired point between the several rollers. These pipes may be fastened to the support members 5 and 6 in any desired manner. For instance they may be secured by means of the pipe straps 41.

In operating the device herein described, the shaft 9 is connected by any suitable means, for instance, such as shown and described herein with a source of power operating at a speed which will cause the roller 10 to rotate at a speed of approximately 400 revolutions per minute. This in turn means that roller 17 will rotate at approximately 35 revolutions per minute and roller 24 will rotate at approximately 70 revolutions per minute. Since the diameter of roller 17 is approximately twice that of roller 24, the peripheral speed of these rollers will be substantially the same.

An animal intestine to be treated or a number of animal intestines are fed between the rollers 17 and 24. The distance between these rollers may be adjusted so as to feed the intestine without damaging the same to even the slightest degree. The intestine tends to follow through the apparatus on the surface of the large roller 17 which as hereinbefore mentioned, may be constructed of brass or other suitable material. In following the roller 17, the intestine passes between roller 17 and the crushing roller 10, which rotates at a relatively high rate of speed.

Due to the construction of the surface of the roller 10 and the rate of speed at which it rotates, the slime or mucous membrane on the interior walls of the animal intestines is crushed or broken from the walls so that it can subsequently be removed with little effort. One of the outstanding features of the present invention is that in crushing the slime from the walls of the animal intestines, the structure herein described has no detrimental effect whatever upon the wall of the animal intestine.

While the structure herein shown consists of the several rollers mounted in the open frame structure, it will be appreciated that suitable guard mechanism such as shown in dotted lines in Figures 1 and 2 may be employed. Also, safety appliances such as means for preventing accidental engagement with the rollers, may also be provided.

It will be appreciated that the present invention provides a novel type of apparatus for breaking or crushing slime or mucous membrane from the interior walls of animal intestines, which consists of a minimum number of elements associated in a rather simplified manner.

While we have shown and described the preferred embodiment of our invention, we wish it to be understood that we do not confine ourselves to the precise details of construction herein set forth, by way of illustration, as it is apparent that many changes and variations may be made therein, by those skilled in the art, without departing from the spirit of the invention, or exceeding the scope of the appended claims.

We claim:

1. An apparatus for crushing slime on the interior walls of animal intestines comprising a slime crushing roller having slightly angular surfaces, a feed roller for feeding the intestines to the crushing roller, and a common roller cooperating with both the feed and the crushing rollers, said feed and crushing rollers rotating in the same direction and said common roller rotating in the opposite direction, said feed and common rollers being of such diameter and being rotated at such speeds that the peripheral speed of each is the same, and means for rotating said crushing roller at a speed whereby its peripheral speed is greater than that of the other rollers, thereby effecting a crushing action on the intestines.

2. An apparatus for crushing slime on the interior walls of animal intestines comprising a slime crushing roller having slightly angular surfaces, a feed roller for feeding the intestines to the crushing roller, and a common roller cooperating with both the feed and the crushing rollers, and means for adjusting independently the position of both the feed and common rollers.

3. An apparatus for crushing slime on the interior walls of animal intestines comprising a slime crushing roller, a feed roller for feeding the intestines to the crushing roller, and a common roller cooperating with both the feed and the crushing rollers, said feed and common rollers being of such diameter and being rotated at such speeds that the peripheral speed of each is the same, and means for rotating said crushing roller at a speed whereby its peripheral speed is greater than that of the other rollers, thereby effecting a crushing and wiping action on the intestines to break up and loosen the slime on the interior walls of the intestines, said common roller and crushing roller being mounted in substantially the same horizontal plane and said feed roller being mounted above the crushing and common rollers, and independent means for adjusting the common roller horizontally, and the feed roller vertically.

4. An apparatus for crushing slime on the interior walls of animal intestines comprising a large smooth surfaced roller mounted for rotation about a horizontal axis, a corrugated feed roller mounted with its axis parallel to that of the smooth surfaced roller, a crushing roller having a corrugated surface mounted to rotate about a horizontal axis parallel to the axes of the other rollers, said crushing roller cooperating with the smooth surfaced roller for crushing the slime in the intestines passing between the rollers to cause the corrugations to exert a wiping action on the intestines to loosen and break up the slime on the interior walls of the intestines, said common roller and crushing roller being mounted in substantially the same horizontal plane and said feed roller being mounted above the crushing and common rollers, and independent means for adjusting the common roller horizontally, and the feed roller vertically.

5. An apparatus for removing the slime from the interior wall of animal intestines comprising support members, each support member having a bearing mounting for a shaft, each of said support members having a horizontal slot formed therein adjacent the bearing mounting, said support members also having a vertical slot formed therein at a point between and above the horizontal slot and the bearing mounting, bearing blocks slidably mounted in each of said slots, a shaft mounted in the bearing blocks positioned in the horizontal slots, a roller of large diameter carried by said shaft, a feed roller adapted to cooperate with said roller of large diameter for feeding intestines through said apparatus, said feed roller being fixed on a shaft mounted in the bearing blocks located in the vertical slots, a crushing roller having slightly angular surfaces carried by a shaft mounted in said bearing mountings and adapted to cooperate with the roller of large diameter for crushing the slime in the intestines passed between said crushing roller and the roller of large diameter, and means for rotating said crushing roller at a speed whereby its peripheral speed is greater than that of the other rollers.

6. An apparatus for removing the slime from the interior wall of animal intestines comprising support members, each support member having a bearing mounting for a shaft, each of said support members having a horizontal slot formed therein adjacent the bearing mounting, said support members also having a vertical slot formed therein at a point between and above the horizontal slot and the bearing mounting, bearing blocks slidably mounted in each of said slots, a shaft mounted in the bearing blocks positioned in the horizontal slots, a roller of large diameter carried by said shaft, a feed roller adapted to cooperate with said roller of large diameter for feeding intestines through said apparatus, said feed roller being fixed on a shaft mounted in the bearing blocks located in the vertical slots, a crushing roller having backwardly slanting teeth carried by a shaft mounted in said bearing mountings and adapted to cooperate with the roller of large diameter for crushing the slime in the intestines passed between said crushing roller and the roller of large diameter, means for rotating said crushing roller at a speed whereby its peripheral speed is greater than that of the other rollers to cause the teeth to exert a wiping action on the intestines to loosen and break up the slime on the interior walls of the intestines, and independent means for moving said bearing blocks to various positions in said slots, for locking the blocks in the adjusted positions.

7. An apparatus for removing the slime from the interior wall of animal intestines comprising support members, each support member having a bearing mounting for a shaft, each of said support members having a horizontal slot formed therein adjacent the bearing mounting, said support members also having a vertical slot formed therein at a point between and above the horizontal slot and the bearing mounting, bearing blocks slidably mounted in each of said slots, a shaft mounted in the bearing blocks positioned in the horizontal slots, a roller of large diameter carried by said shaft, a feed roller adapted to cooperate with said roller of large diameter for feeding intestines through said apparatus, said feed roller being fixed on a shaft mounted in the bearing blocks located in the vertical slots, a crushing roller carried by a shaft mounted in said bearing mountings and adapted to cooperate with the roller of large diameter for crushing the slime in the intestines passed between said crushing roller and the roller of large diameter, means for connecting said shaft carrying the crushing roller to a source of power, a pinion mounted on this shaft, a stub shaft carried by one of said support members, and having a large spur gear and a pinion mounted thereon, said spur gear being meshed with the pinion on the shaft carrying the crushing roller, the pinion on the stub shaft being connected through an idler with a spur gear mounted on the horizontally slidable shaft which in turn is meshed with a pinion carried by the vertically slidable shaft whereby rotary motion imparted to the crushing roller shaft will be transmitted to the shafts carrying the other rollers.

8. An apparatus for crushing slime on the interior walls of animal intestines, comprising means having a moving surface, means to feed the intestines onto the moving surface, and crusher means spaced from the moving surface comprising a plurality of backwardly slanting teeth which are adapted to move in the direction of the moving surface at a higher velocity than the moving surface and which exert a crushing and wiping action on the intestines, whereby the slime is broken up and loosened from the interior walls of the intestines, and means for causing the crusher means to move at a higher velocity than the moving surface.

9. An apparatus for crushing slime on the interior walls of animal intestines comprising a slime crushing roller having a solid substantially non-yielding rim, a feed roller for feeding the intestines to the crushing roller, and a common roller cooperating with both the feed and crushing rollers, the outer surface of the crushing roller being so formed and the speed such that it exerts a crushing and wiping action on the intestines, thereby loosening the slime from the interior walls of the intestines without damaging the intestines, and means for rotating the crushing roller at a greater speed than the common roller.

10. An apparatus for crushing slime on the interior walls of animal intestines, comprising a crushing roller having a solid substantially non-yielding rim having backwardly slanting teeth, a second roller adapted to cooperate with said crushing roller for loosening and breaking up the slime in the interior walls of the intestines, and toothed means for feeding the intestines to the rollers.

WILLIAM MILLER.
CLAUDE RAY VANN.
FRANK GEORGE SMERSAL.